(12) United States Patent
Bulusu et al.

(10) Patent No.: US 8,000,266 B2
(45) Date of Patent: Aug. 16, 2011

(54) SHARED VIRTUAL DEVICE PORTS

(75) Inventors: Shekher Bulusu, Fremont, CA (US);
Ronak Desai, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 561 days.

(21) Appl. No.: 11/612,906

(22) Filed: Dec. 19, 2006

(65) Prior Publication Data

US 2008/0144533 A1 Jun. 19, 2008

(51) Int. Cl.
*H04L 12/28* (2006.01)
(52) U.S. Cl. .................................. 370/256; 370/401
(58) Field of Classification Search .................. 370/256, 370/401, 393, 400
See application file for complete search history.

(56) References Cited

U.S. PATENT DOCUMENTS

| | | | | |
|---|---|---|---|---|
| 5,978,378 A | * | 11/1999 | Van Seters et al. | 370/401 |
| 6,515,969 B1 | * | 2/2003 | Smith | 370/256 |
| 2003/0142680 A1 | * | 7/2003 | Oguchi | 370/400 |
| 2003/0174706 A1 | * | 9/2003 | Shankar et al. | 370/393 |
| 2005/0259597 A1 | | 11/2005 | Benedetto et al. | |
| 2005/0259649 A1 | | 11/2005 | Smith et al. | |
| 2006/0007939 A1 | | 1/2006 | Elangovan | |
| 2006/0268748 A1 | | 11/2006 | Rose | |

OTHER PUBLICATIONS

"Understanding Multiple Spanning Tree Protocol (802.1s)" Jun. 1, 2005.
International Search Report and Written Opinion, mailed May 1, 2008, from PCT Application No. PCT/US07/87102.
CN First Office Action dated Jun. 29, 2010, from CN Application No. 200780046535.0.

* cited by examiner

*Primary Examiner* — Dang T Ton
*Assistant Examiner* — Wei Zhao
(74) *Attorney, Agent, or Firm* — Weaver Austin Villeneuve & Sampson LLP (57) ABSTRACT

In one embodiment, a solution is provided wherein multiple virtual devices may be configured on the same physical port of a network device. For example, a first virtual device and a second virtual device may be configured to use the same physical port. A single internal spanning tree instance may be configured for both the first virtual device and the second virtual device.

32 Claims, 7 Drawing Sheets

FIG. 1

| VD | VLAN | MSTID | MSTMID |
|---|---|---|---|
| VD1 | VLAN1 | MST1 | MSTID1 |
| VD1 | VLAN2 | MST2 | MSTID2 |
| VD1 | VLAN3 | MST3 | MSTID3 |
| VD1 | VLAN4 | MST4 | MSTID4 |
| VD2 | VLAN3 | MST3 | MSTID3 |
| VD2 | VLAN4 | MST4 | MSTID4 |
| VD2 | VLAN5 | MST1 | MSTID5 |
| VD2 | VLAN6 | MST2 | MSTID6 |

SHARED VIRTUAL DEVICE PORTS

BACKGROUND

1. Technical Field

The present disclosure relates to virtual devices in computer networks.

2. Description of the Related Art

A spanning tree is a data structure used to map the paths to the devices in a network. The spanning tree is typically used as a way to avoid loops in the network that could lead to crashes or infinite delays during routing of traffic. Multiple Spanning Tree Protocol (MSTP), as defined in IEEE 802.1q, is a standard wherein multiple spanning trees are utilized in a computer network. MSTP allows Virtual Local Area Networks (VLANs) to be mapped to a different spanning tree instances within the same network, such that traffic corresponding to a first VLAN may be routed according to a first spanning tree, while traffic corresponding to a second VLAN may be routed according to a second spanning tree.

Devices running the MSTP have one or more ports. In addition to mapping each VLAN to a spanning tree, each VLAN can also be matched to one or more of the ports.

DESCRIPTION OF EXAMPLE EMBODIMENTS

Overview

In one embodiment, a solution is provided wherein multiple virtual devices may be configured on the same physical port of a network device. For example, a first virtual device and a second virtual device may be configured to use the same physical port. A single internal spanning tree instance may be configured for both the first virtual device and the second virtual device.

EXAMPLES

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order to not obscure the present invention.

Figure 1:
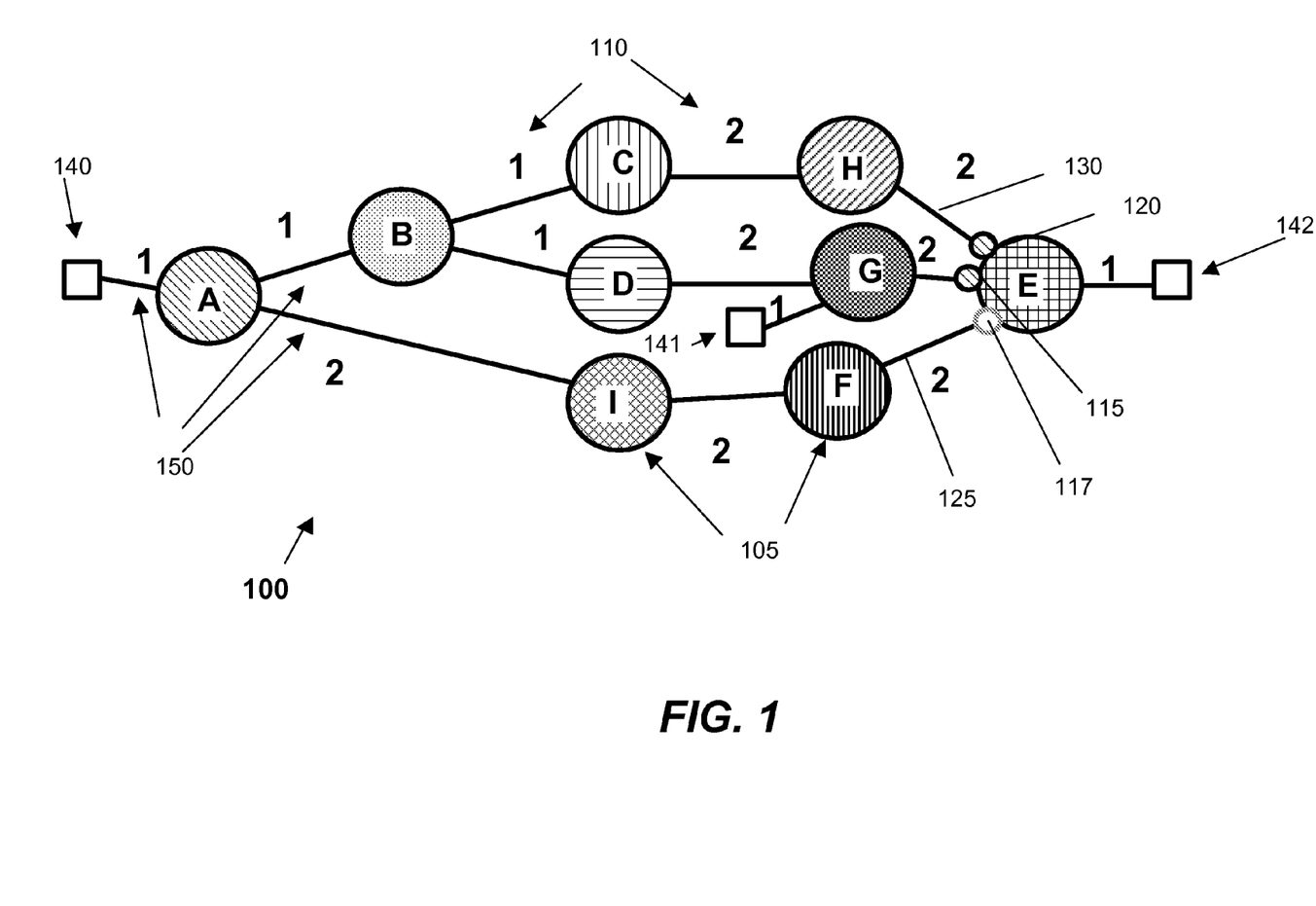
FIG. 1 depicts an example network that includes layer 2 Ethernet bridges conforming to IEEE Std.™ 802.1D-2004 (IEEE 802.1D) or IEEE Std. 802.1Q-2003 (IEEE 802.1Q).

FIG. 1 depicts simple network 100 that includes layer 2 Ethernet bridges conforming to IEEE Std.™ 802.1D-2004 (IEEE 802.1D) or IEEE Std. 802.1Q-2003 (IEEE 802.1Q) 105. In this example, there are 9 bridges A-I and three stations, 140-142, connected via 12 local area networks (LANs) 125, 130, and 150 (10 instances). The letters A-I are Bridge IDs. Lower letters (e.g., A) are "better" than higher letters (e.g., D), according to the convention of IEEE 802.1D or IEEE 802.1Q, which are hereby incorporated by reference for all purposes. Port path costs 110 are indicated for each LAN. This diagram assumes that all bridge ports attached to the same LAN have the same value configured for their port path cost, though this is not required either by IEEE 802.1D or by the present invention.

Bridges create a spanning tree over network 100 by exchanging protocol packets called Bridge Protocol Data Units (BPDUs). Using these packets, the protocol state machines implemented in each bridge select certain ports to be part of the active topology of the network and certain others to be blocked. The spanning tree is "spanning" in the sense that all LANs are connected. It is a "tree" in that there is exactly one path between any given pair of bridges or stations.

According to Spanning Tree Protocol (STP), one of the bridges of network 100 (in this example, bridge A) will be elected as the "Root Bridge". The tree is constructed by each bridge selecting the port that is closest to the Root Bridge as its "Root Port," where "closest" is defined as the path to the root bridge with the least numerical sum of root path costs for the bridge ports traversed. (Only ingress from a LAN to a bridge counts in this summation, not egress from a bridge to a LAN.) Where two or more paths have the same sum of port path costs, tiebreaker values are used. The tiebreaker values are Bridge IDs and Port IDs, as defined in IEEE 802.1D and IEEE 802.1Q. Bridge E selects from among three equal cost paths, thus breaking three potential spanning tree loops, by using the bridge IDs of the adjacent bridges to select port 117 as its root port, and to mark as "alternate ports" and block ports 115 and 120. (Although these terms can have different meanings when used by those of skill in the art, the terms "packet" and "frame" will sometimes be used interchangeably herein).

Although STP provides for the orderly flow of packets, it does not allow for all LANs in a network to be used in an optimal fashion. There is never a path from any bridge or station in the network to the root that has a lower sum of path costs than the path along that root bridge's spanning tree, but paths between other pairs of bridges or stations may not be optimal. For example, if ports 115 and 120 are blocked, the path from station 142 to station 141 is 142-E-F-I-A-B-D-G-141, for a total cost of 11 (station 141 does not count the cost of the last hop), instead of the much shorter path 142-E-G-141, cost 3.

Multiple Spanning Tree Protocol (MSTP) offers an improvement over STP in that multiple spanning trees are created. Network 100 could be configured to have up to 64 spanning trees. For example, each bridge A through I could be configured to be the Regional Root Bridge of a separate multiple spanning tree instance (MSTI). IEEE 802.1Q bases the determination of the MSTI to which a given frame is assigned, and over which that frame is forwarded, solely upon the frame's Virtual Local Area Network Identifier (VLAN ID or VID), which in turn, is based upon only a) which port the frame entered the network, and/or b) what higher-layer protocol the frame carries. VIDs can often be assigned to ports and/or protocols that result in the selection of suitable MSTIs. However, this is not always possible, since any given station connected to the network may converse with a number of other stations, and in turn, they with others. For example, in network 100, each station 140, 141, and 142 may converse with each other.

In one example of the present invention, it is recognized that it may be desirable to share ports between two or more virtual devices using MSTP or a similar port-centric protocol. Each virtual device may be viewed as, for example, a different layer 2 switches with a set of ports assigned to it. A shared port may carry traffic belonging to network classifications (e.g., VLANs belonging to different virtual devices that are mapped on that port). Network identifiers (e.g., VLAN identifiers) may be used to define these classifications. The shared port presents a problem, however, when port-centric protocols such as MSTP, are utilized. This is due to the fact that there is only one MSTP internal spanning tree controlling and running the multiple spanning trees on the shared port, but since the port is shared between multiple virtual devices and each virtual device has its own internal spanning tree, there is the potential for conflict or ambiguity when deciding which tree to utilize.

A typical device running MSTP will have up to 65 different spanning tree instances. The first, called the Internal Spanning Tree (IST) instance, runs on all ports of the physical switch. Then there are up to 64 different Multiple Spanning Tree (MST) instances. The IST instance's job is to receive and send Bridge Protocol Data Units (BPDUs) from and to the MST instances. The BPDU is the data structure that may contain spanning tree information. Each of the 64 different MST instances may be mapped to a different VLAN. Traffic corresponding with that VLAN would then use the corresponding spanning tree.

When multiple virtual devices are defined on a single physical switch, each of the multiple devices has its own IST instance and its own MST instances. As described briefly above, problems may be encountered when one attempts to assign multiple virtual devices to a single port, as it is then not clear which IST instance (and possibly MST instance) to utilize.

One solution would be to simply restrict the virtual devices so that ports are never shared between virtual devices. For obvious reasons, however, this is not an ideal solution, as there is a strong need to share ports between multiple virtual devices so that port bandwidth is efficiently utilized.

In an embodiment of the present invention, virtual devices that share a port may be grouped together as a virtual device group. Then all the IST instances for each virtual device in the virtual device group may be merged into a single IST instance for the entire virtual device group. The virtual devices may maintain their current MST instances. The single IST then may send out BPDUs to all the MST instances in the virtual device group. It should be noted that implementations are possible wherein instead of merging two IST instances, a single joint IST instance is either created from scratch or created using two or more existing IST instances as templates.

It should be noted that MSTs are typically identified by the order in which they are assigned to a VLAN within a virtual device. For example, a particular device may have MSTs identified as $MST_1$-$MST_{64}$, and mapped to $VLAN_1$-$VLAN_{64}$. This can create a problem, however, when a single port is shared between multiple virtual devices, as a first virtual device may have, for example, an $MST_1$ instance and a second virtual device may also have an $MST_1$ instance, despite the fact that the multiple spanning trees themselves are different (mapped to different VLANs). In such circumstances, a mapping table that maps the virtual device and original MST instance to a new MST mapped identification (MSTID) may be utilized. This allows, for example, the first $MST_1$ instance to be assigned MSTID of $MST_1$, while the second $MST_1$ instance may be assigned an MSTID of $MST_2$, removing the conflict.

A shared port can also carry traffic corresponding to multiple network classifications (e.g., VLANs). Ordinarily, a VLAN-to-MST instance mapping would indicate which MST instance to use for a particular VLAN. With a shared port, however, it is possible that the same VLAN may be identified on multiple virtual devices sharing the same port, and those same VLANs may identify different corresponding MST instances. It is therefore necessary to select one single MST instance to correspond to a VLAN that is defined by two or more virtual devices. This may include prompting the user for a selection or randomly selecting one, for example. The MST instance corresponding to each VLAN may also be stored in the mapping table.

Figure 2:
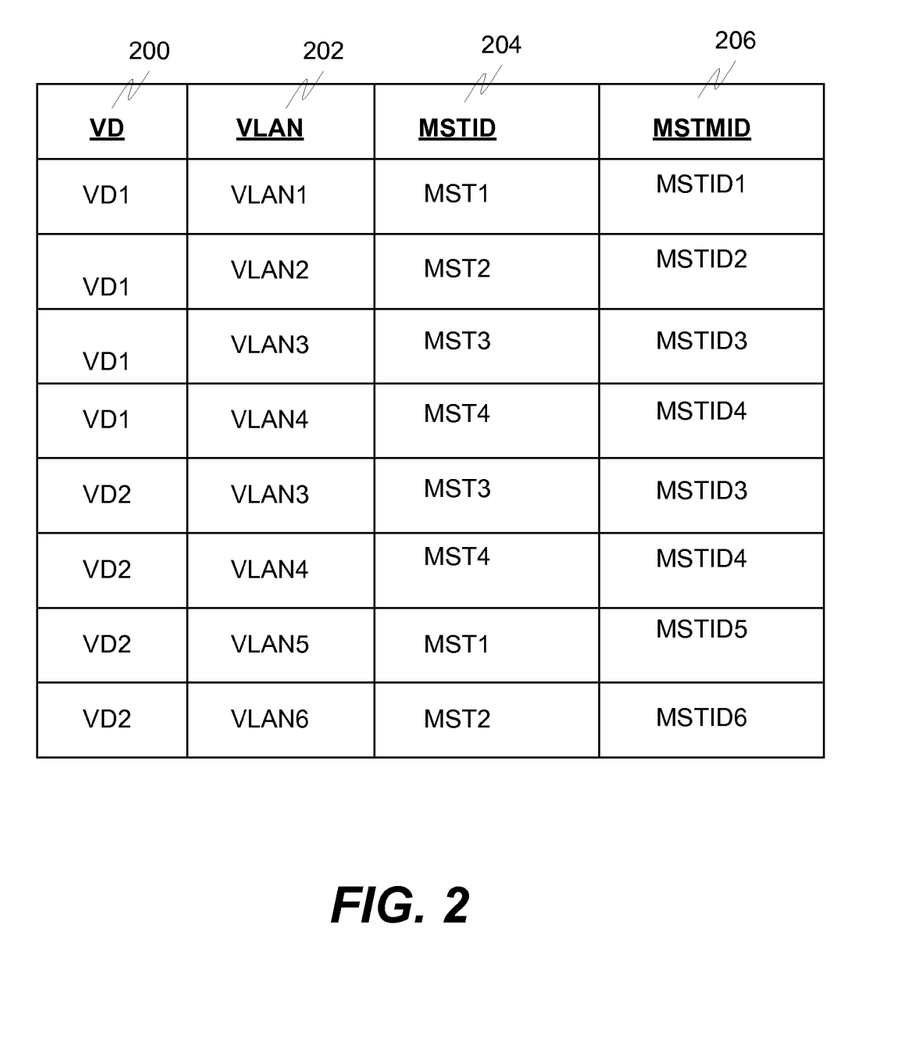
FIG. 2 illustrates an example of a port table in accordance with an embodiment of the present invention.

FIG. 2 illustrates an example of a port table in accordance with an embodiment of the present invention. In this example, one column 200 of the table represents the virtual device identification, another column 202 of the table represents a VLAN identifier, another column 204 of the table represents the MST instance identifier, and another column 206 of the table represents a MST mapped identification.

Regions are typically identified by a signature comprising the name and revision identification of the region and also the instance-VLAN mapping for the port. Thus, a shared port will modify this region signature since a new instance-VLAN mapping (as identified by the mapping table).

Figure 3:
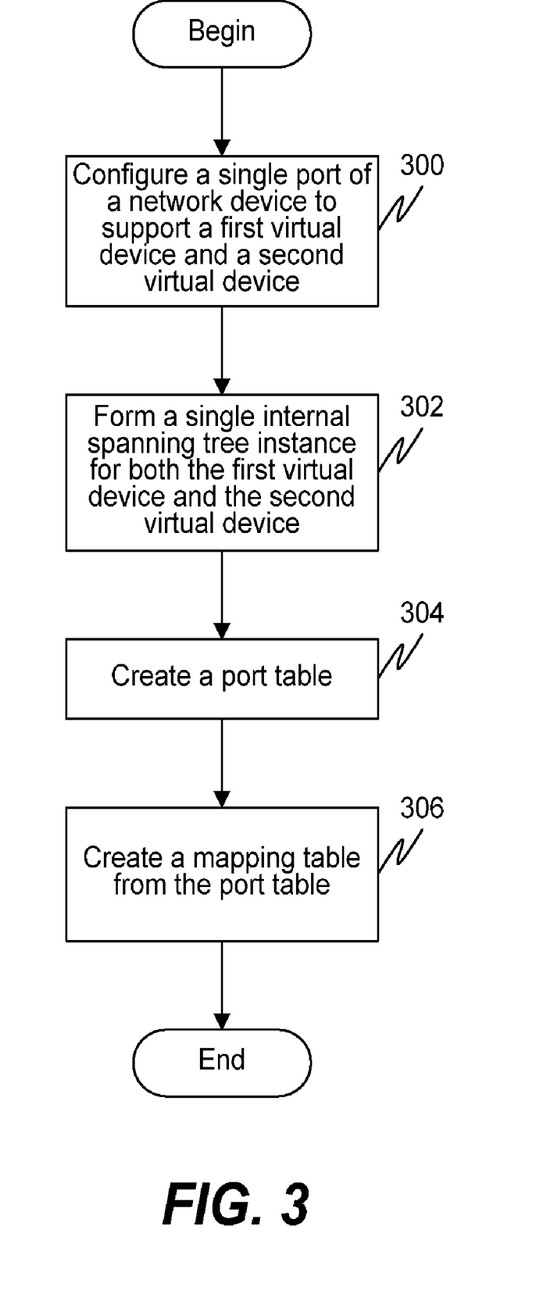
FIG. 3 illustrates an example method for configuring multiple virtual devices to share a single physical port of a network device in accordance with an embodiment of the present invention.

FIG. 3 illustrates an example method for configuring multiple virtual devices to share a single physical port of a network device in accordance with an embodiment of the present invention. The network device may be a switch. At 300, a single port of a network device may be configured to support a first virtual device and a second virtual device. At 302, a single internal spanning tree instance may be formed for both the first virtual device and the second virtual device. In one embodiment, this may involve merging an internal spanning tree corresponding to the first virtual device with an internal spanning tree corresponding to the second virtual device. In another embodiment, this may involve creating a single internal spanning tree instance for both the first and the second virtual devices from scratch (i.e., without reference to an internal spanning tree instance defined for the first virtual device or the second virtual device). At 304, a port table may be created. The port table may indicate, for the port, which network identifications (e.g., VLAN identifications) are assigned to which virtual device. Each network topology or customer may be assigned to only one virtual device. This table may be ascertained from a VLAN to instance mapping for the first virtual device and a VLAN to instance mapping for the second virtual device. For VLANs that could potentially map to two (or more) virtual devices, a choice may then be made by a user or administrator as to which virtual device to assign to the VLAN. Alternatively, some other method may be used to select which virtual device to assign to the VLAN (such as randomly). It should be noted that the port table itself is optional, as the same information may be stored in the mapping table. At 306, a mapping table may be created from the port table. The mapping table may include an identification of each virtual device, the VLANs assigned to the virtual device, corresponding multiple spanning tree instances for the VLANs, and mapped multiple spanning tree instances for the VLANs. The mapped multiple spanning tree instances may represent spanning tree instance identifications that are unique within the mapping table. The creating may include identifying a first multiple spanning tree instance for the first virtual device having a first label identical to a second label of a second multiple spanning tree instance for the second device. The creating may then also include adding, to the mapping table, multiple spanning tree mapping identifications that are unique within the mapping table for each of the first and second multiple spanning tree instances. The creating may also include combining network identifications defined for the first virtual device with network identifications defined for the second virtual device. For network identifications defined for both the first virtual device and the second virtual device, one multiple spanning tree instance may be selected to correspond to the network identification. This may include prompting the user for a selection.

Figure 4:
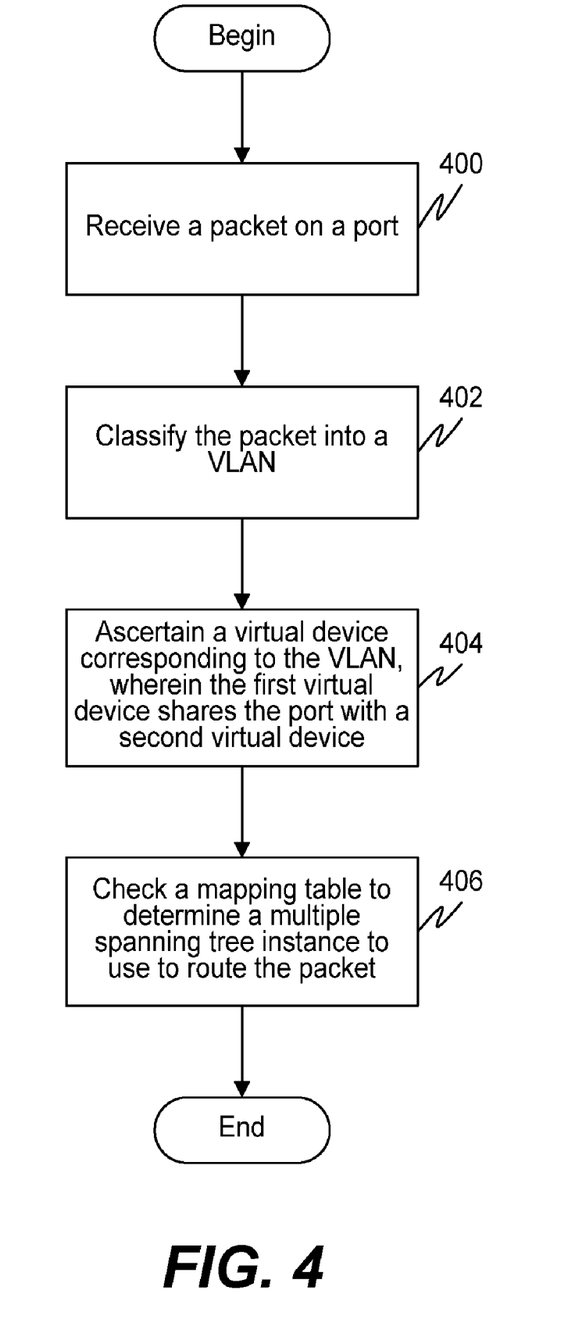
FIG. 4 illustrates an example method for handling a packet in a network device in accordance with an embodiment of the present invention.

FIG. 4 illustrates an example method for handling a packet in a network device in accordance with an embodiment of the present invention. At 400, the packet may be received on a port. At 402, the packet may be classified into a VLAN. This may be accomplished by, for example, examining a tag in the packet itself. At 404, a first virtual device corresponding to the VLAN may be ascertained, wherein the first virtual device shares the port with a second virtual device. This may be accomplished by, for example, checking a mapping or port table using the VLAN identified in 402 and retrieving the corresponding virtual device from that table. At 406, a mapping table may be checked to determine a multiple spanning tree instance to use for routing the packet. The mapping table may contain unique identifications for each of a plurality of multiple spanning tree instances corresponding to the port. The spanning tree instance chosen may be the one corresponding to the VLAN and virtual device corresponding to the packet identified earlier.

Figure 5:
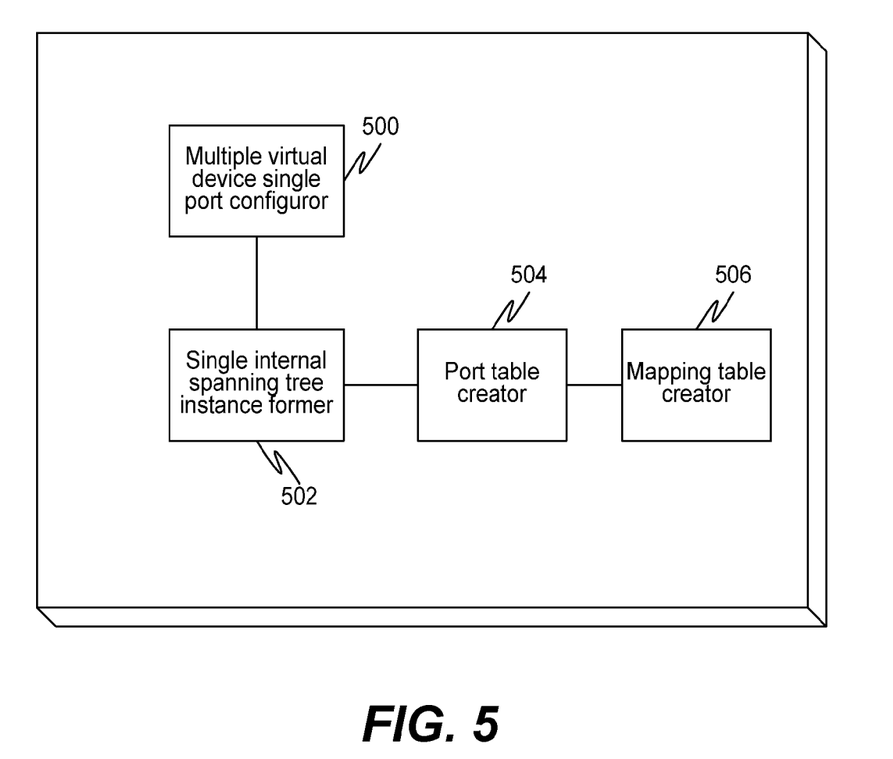
FIG. 5 illustrates an example apparatus for configuring multiple virtual devices to share a single physical port of a network device in accordance with an embodiment of the present invention.

FIG. 5 illustrates an example apparatus for configuring multiple virtual devices to share a single physical port of a network device in accordance with an embodiment of the present invention. The network device may be a switch. A multiple virtual device single port configuror 500 may configure a single port of a network device to support a first virtual device and a second virtual device. A single internal spanning tree instance former 502 coupled to the multiple virtual device single port configuror 500 may form a single internal spanning tree instance for both the first virtual device and the second virtual device. In one embodiment, this may involve merging an internal spanning tree corresponding to the first virtual device with an internal spanning tree corresponding to the second virtual device. In another embodiment, this may involve creating a single internal spanning tree instance for both the first and the second virtual devices from scratch (i.e., without reference to an internal spanning tree instance defined for the first virtual device or the second virtual device). A port table creator 504 coupled to the single internal spanning tree instance former 502 may create a port table. The port table may indicate, for the port, which network identifications (e.g., VLAN identifications) are assigned to which virtual device. Each network topology or customer may be assigned to only one virtual device. This table may be ascertained from a VLAN to instance mapping for the first virtual device and a VLAN to instance mapping for the second virtual device. For VLANs that could potentially map to two (or more) virtual devices, a choice may then be made by a user or administrator as to which virtual device to assign to the VLAN. Alternatively, some other method may be used to select which virtual device to assign to the VLAN (such as randomly). It should be noted that the port table itself is optional, as the same information may be stored in the mapping table. A mapping table creator 506 coupled to the port table creator 504 may create a mapping table from the port table. The mapping table may include an identification of each virtual device, the VLANs assigned to the virtual device, corresponding multiple spanning tree instances for the VLANs, and mapped multiple spanning tree instances for the VLANs. The mapped multiple spanning tree instances may represent spanning tree instance identifications that are unique within the mapping table. The creating may include identifying a first multiple spanning tree instance for the first virtual device having a first label identical to a second label of a second multiple spanning tree instance for the second device. The creating may then also include adding, to the mapping table, multiple spanning tree mapping identifications that are unique within the mapping table for each of the first and second multiple spanning tree instances. The creating may also include combining network identifications defined for the first virtual device with network identifications defined for the second virtual device. For network identifications defined for both the first virtual device and the second virtual device, one multiple spanning tree instance may be selected to correspond to the network identification. This may include prompting the user for a selection.

Figure 6:
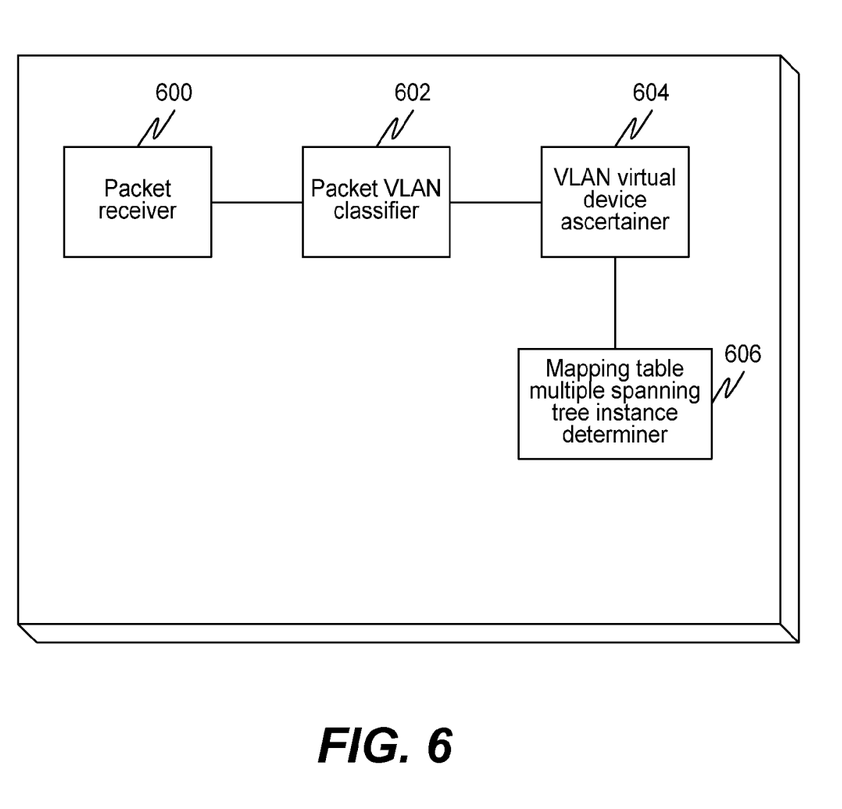
FIG. 6 illustrates an example apparatus for handling a packet in a network device in accordance with an embodiment of the present invention.

FIG. 6 illustrates an example apparatus for handling a packet in a network device in accordance with an embodiment of the present invention. A packet receiver 600 may receive the packet on a port. A packet VLAN classifier 602 coupled to the packet receiver 600 may classify the packet into a VLAN. This may be accomplished by, for example, examining a tag in the packet itself. A VLAN virtual device ascertainer 604 coupled to the packet VLAN classifier 602 may ascertain a first virtual device corresponding to the VLAN, wherein the first virtual device shares the port with a second virtual device. This may be accomplished by, for example, checking a mapping or port table using the VLAN identified earlier and retrieving the corresponding virtual device from that table. A mapping table multiple spanning tree instance determiner 606 coupled to the VLAN virtual device ascertainer 604 may check a mapping table to determine a multiple spanning tree instance to use to route the packet. The mapping table may contain unique identifications for each of a plurality of multiple spanning tree instances corresponding to the port. The spanning tree chosen may be the one corresponding to the VLAN and virtual device corresponding to the packet identified earlier.

Figure 7:
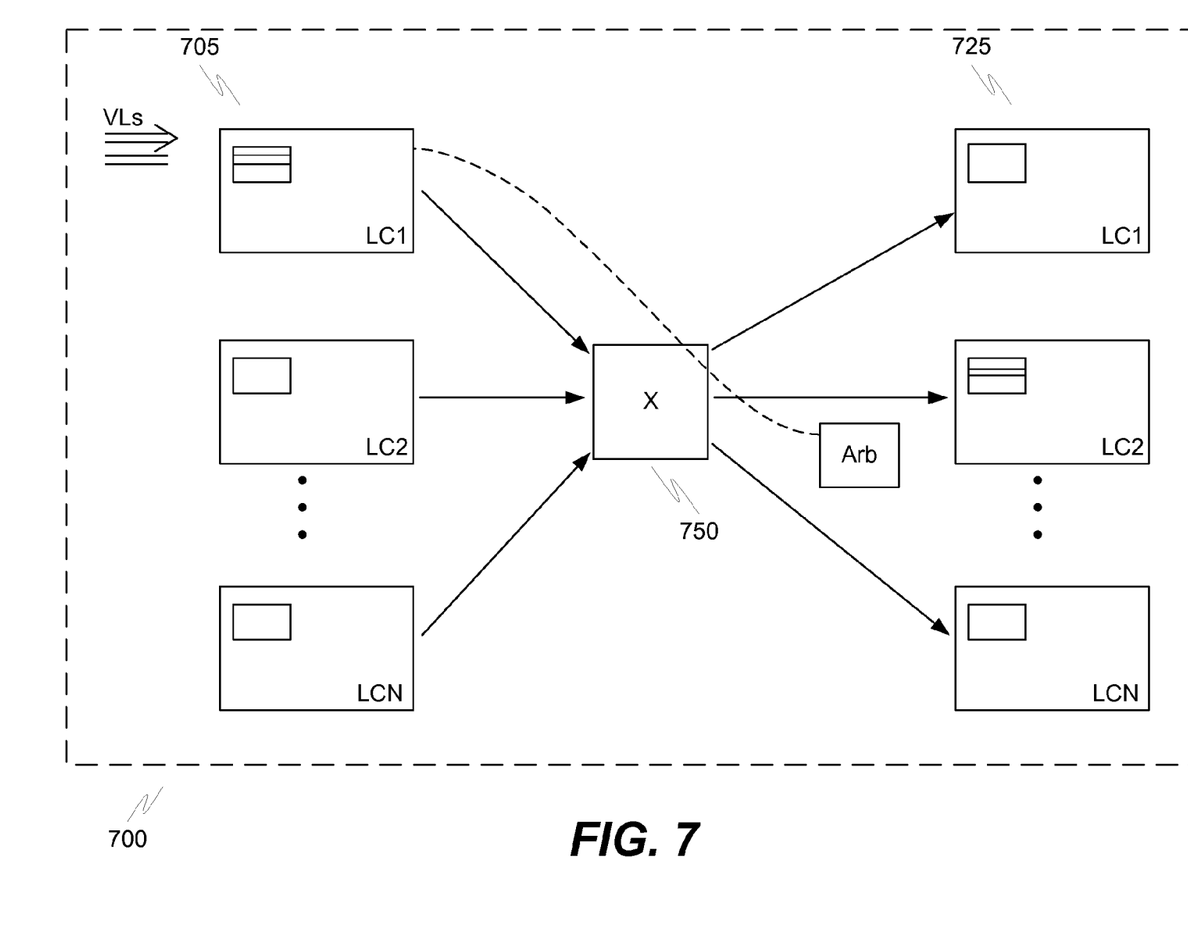
FIG. 7 illustrates a simplified architecture of a switch.

FIG. 7 illustrates a simplified architecture of a switch 700. Switch 700 includes N line cards, each of which characterized by an ingress side (or input) 705 and an egress side (or output) 725. Line card ingress sides 765 are connected via switching fabric 750, which includes a crossbar in this example, to line card egress sides 725. In this embodiment, one or more line cards performs one or more of the processes described above.

It should be noted that even though throughout this document reference is made to a first virtual device and a second virtual device, the claimed invention may include embodiments where more than two virtual devices share the same physical port.

It should also be noted that, while MSTP is discussed, the claimed invention may include embodiments wherein other protocols are utilized. Additionally, the term "spanning tree" should be read broadly to include any data structure used to map the layout of network devices. "Internal spanning tree" should be read broadly to include any spanning tree used to update other spanning trees. "Multiple spanning tree" should be ready broadly to include any spanning tree used for the routing of packets.

Additionally, whenever tables are mentioned in this document, the term should be interpreted broadly to encompass any data structure in any format.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

We claim:

1. A method comprising:

configuring a single port of a network device to operate as a port of a first virtual device and operate as a port of a second virtual device such that the single port carries traffic associated with the first virtual device and carries traffic associated with the second virtual device, wherein the port carries traffic belonging to a first set of network classifications supported by the first virtual device and a second set of network classifications supported by the second virtual device, and wherein the network device runs a port-centric protocol; and forming a single internal spanning tree instance for both the first virtual device and the second virtual device such that the first virtual device and the second virtual device share the single internal spanning tree instance, wherein forming the single internal spanning tree instance for both the first virtual device and the second virtual device such that the first virtual device and the second virtual device share the single internal spanning tree instance comprises:

selecting a single multiple spanning tree instance from two different multiple spanning tree instances such that the single multiple spanning tree instance corresponds to a specific network classification, wherein the specific network classification is in both the first set of network classifications and the second set of network classifications, and wherein the two different multiple spanning tree instances include a first multiple spanning tree instance associated with the first virtual device and a second multiple spanning tree instance associated with the second virtual device.

2. The method of claim 1, further comprising:

creating a mapping table, wherein the mapping table contains information pertaining to at least one network identification and at least one corresponding multiple spanning tree mapping identification, wherein each multiple spanning tree mapping identification identifies a multiple spanning tree instance that corresponds to a particular network identification, wherein a first set of multiple spanning tree instances is associated with the first virtual device and wherein a second set of multiple spanning tree instances is associated with the second virtual device, wherein the single internal spanning tree instance corresponds to a network identification supported by both the first virtual device and the second virtual device.

3. The method of claim 2, wherein the network identifications are Virtual Local Area Network (VLAN) identifications.

4. The method of claim 2, wherein the creating includes:

identifying a first multiple spanning tree instance for the first virtual device having a first label identical to a second label of a second multiple spanning tree instance for the second device; and adding, to the mapping table, multiple spanning tree mapping identifications that are unique within the mapping table for each of the first and second multiple spanning tree instances.

5. The method of claim 2, wherein the creating includes combining network identifications defined for the first virtual device with network identifications defined for the second virtual device.

6. The method of claim 1, wherein the specific network classification comprises a network identification defined for both the first virtual device and the second virtual device.

7. The method of claim 1, wherein the selecting comprises prompting a user for a selection.

8. The method of claim 1, wherein the network device is a switch.

9. The method of claim 1, wherein the forming the single internal spanning tree instance comprises merging an internal spanning tree instance defined for the first virtual device with an internal spanning tree instance defined for the second virtual device.

10. The method of claim 1, wherein the forming a single spanning tree instance comprises creating a single spanning tree for both the first and second virtual devices without referencing an internal spanning tree instance defined for the first virtual device or the second virtual device.

11. The method of claim 1, wherein the single port is a physical port, the method further comprising:

creating a port table, wherein the port table indicates, for the physical port, which network identifications are assigned to which virtual device.

12. The method as recited in claim 1, further comprising:

receiving a packet on the port;

identifying a Virtual Local Area Network (VLAN) for the packet;

ascertaining that the first virtual device corresponds to the VLAN, wherein the first virtual device has a first set of ports assigned to the first virtual device and wherein the second virtual device has a second set of ports assigned to the second virtual device, wherein the first set of ports includes the port and the second set of ports includes the port; and determining a multiple spanning tree instance to use for routing the packet by checking a data structure containing unique identifications for each of a plurality of multiple spanning tree instances corresponding to the first virtual device.

13. The method of claim 12, wherein identifying the VLAN for the packet includes examining a VLAN tag in the packet.

14. The method of claim 12, wherein the ascertaining includes checking a port table corresponding to the port, the port table including one or more VLAN identifications and corresponding virtual devices.

15. The method of claim 12, wherein the ascertaining includes checking a mapping table.

16. The method of claim 15, wherein the mapping table includes information about one or more network identifications and corresponding multiple spanning tree mapping identifications.

17. A switch comprising:

one or more line cards, wherein at least one of the one or more line cards is configured to:

configure a single port of a network device to operate as one of a set of ports of a first virtual device;

configure the single port of the network device to operate as one of a set of ports of a second virtual device, thereby enabling the single port to be assigned as a port of both the first virtual device and the second virtual device, wherein the port carries traffic belonging to a first set of network classifications supported by the first virtual device and a second set of network classifications supported by the second virtual device, and wherein the network device runs a port-centric protocol; and form a single internal spanning tree instance for both the first virtual device and the second virtual device such that the first virtual device and the second virtual device share the single internal spanning tree instance, wherein the single internal spanning tree instance for both the first virtual device and the second virtual device is formed by selecting a single multiple spanning tree instance from two different multiple spanning tree instances such that the single multiple spanning tree instance corresponds to a specific network classification, wherein the specific network classification is in both the first set of network classifications and the second set of network classifications, and wherein the two different multiple spanning tree instances include a first multiple spanning tree instance associated with the first virtual device and a second multiple spanning tree instance associated with the second virtual device.

18. The switch as recited in claim 17,
wherein at least one of the one or more line cards is further configured to:
receive a packet on a port;
identify a Virtual Local Area Network (VLAN) for the packet;
ascertain that the first virtual device corresponds to the VLAN, wherein the first virtual device has a first set of ports assigned thereto and wherein the second virtual device has a second set of ports assigned thereto, wherein the first set of ports and the second set of ports includes the port; and
determine a multiple spanning tree instance to use for routing the packet by checking a data structure containing unique identifications for each of a plurality of multiple spanning tree instances corresponding to the port.

19. An apparatus comprising:
means for configuring a single port of a network device to operate as a port of a first virtual device and operate as a port of a second virtual device such that the single port carries traffic associated with a first set of network identifications defined for the first virtual device and carries traffic associated with a second set of network identifications defined for the second virtual device, wherein the port carries traffic belonging to a first set of network classifications supported by the first virtual device and a second set of network classifications supported by the second virtual device, and wherein the network device runs a port-centric protocol; and
means for forming a single spanning tree instance for both the first virtual device and the second virtual device such that the first virtual device and the second virtual device share the single internal spanning tree instance, wherein the means for forming a single spanning tree instance selects only one multiple spanning tree instance to correspond to a particular network identification, the particular network identification being in both the first set of network identifications and the second set of network identifications, wherein forming the single internal spanning tree instance for both the first virtual device and the second virtual device such that the first virtual device and the second virtual device share the single internal spanning tree instance comprises:
selecting a single multiple spanning tree instance from two different multiple spanning tree instances such that the single multiple spanning tree instance corresponds to a specific network classification, wherein the specific network classification is in both the first set of network classifications and the second set of network classifications, and wherein the two different multiple spanning tree instances include a first multiple spanning tree instance associated with the first virtual device and a second multiple spanning tree instance associated with the second virtual device.

20. The apparatus as recited in claim 19, further comprising:
means for receiving a packet on a port;
means for identifying a Virtual Local Area Network (VLAN) for the packet;
means for ascertaining that the first virtual device corresponds to the VLAN, wherein the first virtual device has a first set of ports assigned thereto and wherein the second virtual device has a second set of ports assigned thereto, wherein the first set of ports includes the port and the second set of ports includes the port; and
means for determining a multiple spanning tree instance to use for routing the packet by checking a data structure containing unique identifications for each of a plurality of multiple spanning tree instances corresponding to the first virtual device.

21. The switch as recited in claim 17, wherein the first virtual device has associated therewith a first set of multiple spanning tree instances and the second virtual device has associated therewith a second set of multiple spanning tree instances, wherein each multiple spanning tree instance in the first set of multiple spanning tree instances corresponds to a different one of a first set of Virtual Local Area Networks (VLANs) and wherein each multiple spanning tree instance in the second set of multiple spanning tree instances corresponds to a different one of a second set of VLANs, wherein the single internal spanning tree instance corresponds to a specific VLAN that is in both the first set of VLANs and the second set of VLANs.

22. The method as recited in claim 17, wherein the first virtual device has associated therewith a first set of multiple spanning tree instances and the second virtual device has associated therewith a second set of multiple spanning tree instances, wherein each multiple spanning tree instance in the first set of multiple spanning tree instances corresponds to a different one of a first set of Virtual Local Area Networks (VLANs) and wherein each multiple spanning tree instance in the second set of multiple spanning tree instances corresponds to a different one of a second set of VLANs;
wherein a specific VLAN is supported by both the first virtual device and the second virtual device, wherein the VLAN has associated therewith two different multiple spanning tree instances, wherein the two different multiple spanning tree instances include one of the first set of multiple spanning tree instances and one of the second set of multiple spanning tree instances, the method further comprising:
selecting only one of the two different multiple spanning tree instances to correspond to the VLAN.

23. The switch as recited in claim 18, wherein the first virtual device has associated therewith a first set of multiple spanning tree instances and the second virtual device has associated therewith a second set of multiple spanning tree instances, wherein each multiple spanning tree instance in the first set of multiple spanning tree instances corresponds to a different one of a first set of Virtual Local Area Networks (VLANs) and wherein each multiple spanning tree instance in the second set of multiple spanning tree instances corresponds to a different one of a second set of VLANs, wherein at least one of the one or more line cards is further configured to:
  determine one of the first set of multiple spanning tree instances to use for routing the packet by checking a data structure containing unique identifications for each of a plurality of multiple spanning tree instances corresponding to the first virtual device.

24. The switch as recited in claim 23, wherein a specific VLAN is supported by the first virtual device and the second virtual device, wherein the specific VLAN has associated therewith two different multiple spanning tree instances, wherein the two different multiple spanning tree instances include one of the first set of multiple spanning tree instances and one of the second set of multiple spanning tree instances, wherein only one of the two different multiple spanning tree instances is selected to correspond to the specific VLAN.

25. The switch as recited in claim 17, wherein the single internal spanning tree instance controls and runs multiple spanning trees on the port.

26. The switch as recited in claim 17, wherein the switch runs a Multiple Spanning Tree Protocol (MSTP).

27. The switch as recited in claim 18, wherein the switch runs a Multiple Spanning Tree Protocol (MSTP).

28. The method as recited in claim 1, wherein the network classifications include virtual local area networks (VLANs).

29. The method as recited in claim 28, wherein the port-centric protocol is MSTP.

30. A method comprising:
  configuring a single port of a network device to operate as a port of a first virtual device and operate as a port of a second virtual device such that the single port carries traffic associated with the first virtual device and carries traffic associated with the second virtual device; and
  forming a single internal spanning tree instance for both the first virtual device and the second virtual device such that the first virtual device and the second virtual device share the single internal spanning tree instance;
  wherein the port carries traffic belonging to a first set of Virtual Local Area Networks (VLANs) supported by the first virtual device and a second set of VLANs supported by the second virtual device, wherein the first virtual device has associated second virtual device, wherein the first virtual device has associated therewith a first set of multiple spanning tree instances and the second virtual device has associated therewith a second set of multiple spanning tree instances, wherein each multiple spanning tree instance in the first set of multiple spanning tree instances corresponds to a different one of the first set of VLANs and wherein each multiple spanning tree instance in the second set of multiple spanning tree instances corresponds to a different one of the second set of VLANs;
  wherein a specific VLAN in both the first set of VLANs and the second set of VLANs has associated therewith two different multiple spanning tree instances, wherein the two different multiple spanning tree instances include one of the first set of multiple spanning tree instances and one of the second set of multiple spanning tree instances, wherein forming the single internal spanning tree instance for both the first virtual device and the second virtual device such that the first virtual device and the second virtual device share the single internal spanning tree instance comprises:
  selecting only one of the two different multiple spanning tree instances to correspond to the specific VLAN.

31. An apparatus, comprising:
  means for configuring a single port of a network device to operate as a port of a first virtual device and operate as a port of a second virtual device such that the single port carries traffic associated with the first virtual device and carries traffic associated with the second virtual device; and
  means for forming a single internal spanning tree instance for both the first virtual device and the second virtual device such that the first virtual device and the second virtual device share the single internal spanning tree instance;
  wherein the port carries traffic belonging to a first set of Virtual Local Area Networks (VLANs) supported by the first virtual device and a second set of VLANs supported by the supported by the second virtual device, wherein the first virtual device has associated therewith a first set of multiple spanning tree instances and the second virtual device has associated therewith a second set of multiple spanning tree instances, wherein each multiple spanning tree instance in the first set of multiple spanning tree instances corresponds to a different one of the first set of VLANs and wherein each multiple spanning tree instance in the second set of multiple spanning tree instances corresponds to a different one of the second set of VLANs;
  wherein a specific VLAN in both the first set of VLANs and the second set of VLANs has associated therewith two different multiple spanning tree instances, wherein the two different multiple spanning tree instances include one of the first set of multiple spanning tree instances and one of the second set of multiple spanning tree instances, wherein the single internal spanning tree instance is formed by selecting only one of the two different multiple spanning tree instances to correspond to the specific VLAN.

32. A switch comprising:
  one or more line cards, wherein at least one of the one or more line cards is configured to:
  configure a single port of a network device to operate as a port of a first virtual device and operate as a port of a second virtual device such that the single port carries traffic associated with the first virtual device and carries traffic associated with the second virtual device; and
  form a single internal spanning tree instance for both the first virtual device and the second virtual device such that the first virtual device and the second virtual device share the single internal spanning tree instance;
  wherein the port carries traffic belonging to a first set of Virtual Local Area Networks (VLANs) supported by the first virtual device and a second set of VLANs therewith a first set of multiple spanning tree instances and the second virtual device has associated therewith a second set of multiple spanning tree instances, wherein each multiple spanning tree instance in the first set of multiple spanning tree instances corresponds to a different one of the first set of VLANs and wherein each multiple spanning tree instance in the second set of multiple spanning tree instances corresponds to a different one of the second set of VLANs;
  wherein a specific VLAN in both the first set of VLANs and the second set of VLANs has associated therewith two different multiple spanning tree instances, wherein the two different multiple spanning tree instances include one of the first set of multiple spanning tree instances and one of the second set of multiple spanning tree instances, wherein forming the single internal spanning tree instance for both the first virtual device and the second virtual device such that the first virtual device and the second virtual device share the single internal spanning tree instance comprises:

selecting only one of the two different multiple spanning tree instances to correspond to the specific VLAN.

* * * * *